Sept. 24, 1940.   O. RAWLINSON   2,216,048
AUTOMATIC EQUALIZING BRAKE RIGGING
Filed April 20, 1940
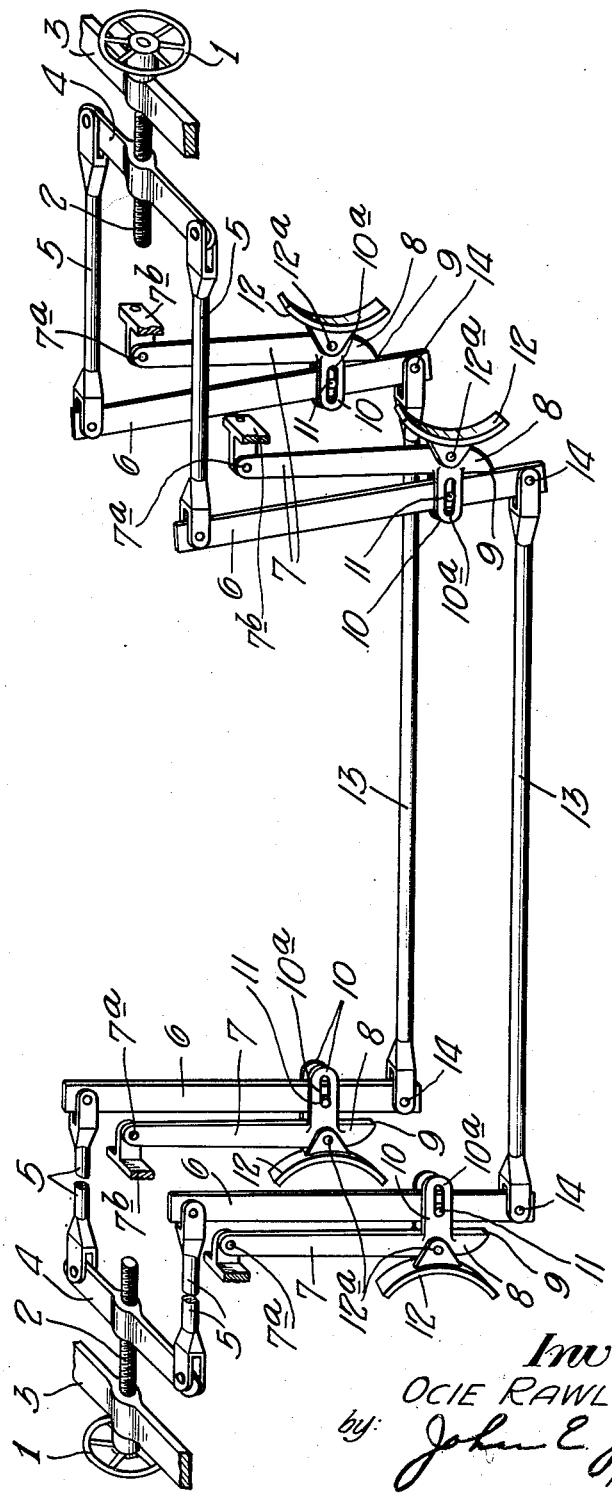
Inventor:
OCIE RAWLINSON,
by: John E. Jackson
his Attorney.

Patented Sept. 24, 1940

2,216,048

UNITED STATES PATENT OFFICE 2,216,048

AUTOMATIC EQUALIZING BRAKE RIGGING

Ocie Rawlinson, Birmingham, Ala.

Application April 20, 1940, Serial No. 330,788

3 Claims. (Cl. 188—107)

This invention relates to improvements in brake rigging adapted to be operated from either end of the vehicle. While not limited thereto, the invention is peculiarly well suited for use on locomotives used to haul mine cars.

The invention will be fully apparent from the following detailed description when read in connection with the accompanying drawing, in which the single figure is a perspective view illustrating the essential elements of the improved rigging.

In the drawing, it will be seen that the rigging includes duplicate apparatus at opposite ends of the car. The corresponding parts at the opposite ends are identified by similar reference characters, and the description of the parts at one end will suffice for those at the other end.

Referring in detail to the drawing, the numeral 1 represents a manually operable brake wheel which actuates a brake screw 2 suitably journaled in a fixed cross member 3 secured to the locomotive frame.

The screw is threaded through the central nut portion of a brake-actuating member 4 having oppositely extending lateral arms to the extremities of which are connected operating links 5 which in turn are pivotally connected with upright arms 6.

Adjacent the arms 6 and aligned longitudinally therewith there are suspension levers 7 which are pivotally suspended at 7ª from brackets 7ᵇ suitably secured to any fixed part of any locomotive framework. The lower end 8 of each suspension lever 7 terminates in a fulcrum point 9 adapted to coact with the opposed edge of the adjacent upright arm 6 in a manner to be hereinafter more fully explained.

Each suspension lever 7 is provided with a lateral extension 10 having an elongated slot 10ª formed therein in which rides a pin 11 secured to the upright arm 6. This pin and slot connection provides a lost motion connection between each upright arm 6 and each suspension lever 7, the assemblage being such that the major elements of the brake rigging are floatingly supported from the suspension lever 7, as shown. Pivotally secured to each suspension lever there is a brake shoe 12 supported by a pivot pin 12ª carried by the lever and passing through suitable lugs formed in the brake shoe, as shown.

The upright arms 6 at the opposite ends of the car are connected with one another by means of connecting rods 13 through pins 14, as shown.

The brake mechanism as above constructed and arranged can be applied from either end of the locomotive at all times, but if it has been released from one end and applied from the other end, it is then necessary to release it from the same end from which it was last applied.

Heretofore, brake rigging of the general character of that shown has been employed with the exception that in the prior construction the suspension lever 7 has not been connected with the upright arm 6 with a pin and slot connection, nor has the suspension lever 7 been formed with a lower extension 8 having a fulcruming portion 9 for coaction with the upright arm 6. In the prior devices, inasmuch as the screw 2 and cross arm 4 are concealed by the body of the locomotive, it is not possible to readily observe the position of either the arm or the screw. Thus, in the prior art arrangements, if, in releasing the brake, the screw at one end of the locomotive is turned too far, the screw at the other end will not have enough travel to take up the slack. Also, if the brake of the prior art is not frequently and accurately adjusted, the motion lost due to either of the brake shoes and either of the pin joints will amount to more than the capacity of the screws. The present invention overcomes these disadvantages largely by the provision of the lost motion pin and slot connection between the suspension lever 7 and the upright arm 6, and the arrangement of parts is such that the extension 8 of the lever 7 will fulcrum on its point 9 against the adjacent face or edge of the upright arm 6 when the braking pressure is applied. In releasing the brake, the shoe 12 under the present invention is not pulled away form the wheel by the pin 11, as in the prior brake rigging, but swings away due to its own weight.

The drawing shows the component parts of the brake rigging in the position they assume when the brake is released from the right end. As illustrated at the right side of the drawing, the point 9 of the suspension lever 7 makes fulcruming engagement with the upright arm 6, the screw 2 at the right end having been turned farther than necessary, and the pin 11 (of right-hand upright arm 6) having moved toward the left in the slot 10 (in the right-hand suspension lever 7). Now if the brake is to be applied from the right end, the screw is turned in until the slack in the slot is taken up and the shoe 12 (at the right) is tightened against the wheel. If it is desired to apply the brake from the left end, the screw on that end is turned in. In this instance, it is not necessary to take up slack in the slot 10, as the shoe starts moving simultaneously with the turning of the screw, for the reason that the left-hand pin 11 is already in contact with the end of the slot 10, as shown in the drawing. On the right end, the fulcrum point has been changed from the pin 11 to the fulcrum point 9 at the end of the suspension lever 7, the drawing so illustrating this condition. The pin and slot connection 10—11 is necessary to prevent locking of the rigging when the screw is turned too far. If, instead of there being a slot in the extension 10, the pin 11 engaged a round hole of the same diameter as the pin, all motion would be stopped when the point 9 of the lever 7 came in contact with the upright arm 6. The rigging, as above constructed and arranged, is such that it is impossible to let out more slack on one end than can be taken up at the other end, thus making certain that the brake can be effectively applied from either end.

While I have described quite specifically the embodiment of the invention illustrated, it is apparent that various modifications may be made by those skilled in the art without departure from the invention as defined in the appended claims.

I claim:

1. Vehicle brake apparatus comprising respective screw-propelled members operable from each end of the vehicle; respective operating links connected thereto; respective upright arms connected to the inner ends of said links; respective suspension levers pivoted at their upper ends to fixed supports; a respective brake shoe carried by each of said levers; a lost motion connection between each suspension lever and each upright arm, each suspension lever having a fulcrum portion adapted to contact with said arm below said connection whereby the assemblage makes it impossible to let out more slack at one end of the vehicle than can be taken up at the other, thus making certain that the brake can be effectively applied from either end.

2. Vehicle brake apparatus comprising respective screw-propelled members operable from each end of the vehicle; respective operating links connected thereto; respective upright arms connected to the inner ends of said links; respective suspension levers pivoted at their upper ends to fixed supports, each lever having a lateral extension and a fulcrum portion at its lower extremity; pin and slot connection means making a lost motion coupling between each of said arms and each of said suspension levers; and a respective brake shoe carried by each of said levers whereby the assemblage makes it impossible to let out more slack at one end of the vehicle than can be taken up at the other, thus making certain that the brake can be effectively applied from either end.

3. Brake apparatus for mine locomotives, comprising a manually operable screw journaled in a fixed frame member at each end of the locomotive; a transversely-extending member at each end of the locomotive arranged to be moved longitudinally toward and from the center of the locomotive by a respective one of said screws; respective operating links connected at an outer extremity of each of said transverse members; respective upright arms connected with the inner ends of each of said operating links; respective suspension levers supported at their upper extremities on pivots fixedly secured to the locomotive frame, each lever having near its lower end a lateral extension with an elongated slot formed therein; a pin carried by each upright arm and extending into said slot so as to provide a lost motion connection between the suspension lever and the arm, said suspension lever having a portion below the lateral extension adapted to make a fulcruming engagement with the opposed edge face of said upright arm; a brake shoe pivotally supported by each suspension lever at a region above the fulcrum portion thereof, and respective connecting members coupling the upright arms at the opposite ends of the locomotive, the aforesaid parts being so assembled that it is impossible to let out more slack at one end of the locomotive than can be taken up at the other, thus making certain that the brake can be effectively applied from either end thereof.

OCIE RAWLINSON.